United States Patent [19]

Dault et al.

[11] Patent Number: 5,436,417

[45] Date of Patent: Jul. 25, 1995

[54] GRAVITY ACTUATED ELECTRICAL SWITCH AND LAMP ASSEMBLY

[75] Inventors: Robert Dault, Ferrysburg; Jimmie Lewis, Oxford, both of Mich.

[73] Assignee: ADAC Plastics, Inc., Grand Rapids, Mich.

[21] Appl. No.: 280,733

[22] Filed: Jul. 26, 1994

[51] Int. Cl.6 ............................................. H01H 35/02
[52] U.S. Cl. .................................. 200/61.52; 200/61.83
[58] Field of Search .................... 200/61.45 R–61.53, 200/61.45 M, 61.62–61.82, 61.83, DIG. 29; 362/71.80, 153–155

[56] References Cited

U.S. PATENT DOCUMENTS

| | | | |
|---|---|---|---|
| 3,164,383 | 1/1965 | Roop et al. | 273/52 |
| 3,270,159 | 8/1966 | Soos | 200/85 |
| 3,499,132 | 3/1970 | Stevens | 200/61.93 |
| 3,896,278 | 7/1975 | Murawski et al. | 200/52 R |
| 3,975,722 | 8/1976 | Adler et al. | 340/261 |
| 4,042,796 | 8/1977 | Zink | 200/61.45 R |
| 4,083,032 | 4/1978 | Nakamura et al. | 200/61.45 R |
| 4,104,492 | 8/1978 | Pliml, Jr. | 200/61.52 X |
| 4,144,532 | 3/1979 | Boyd | 340/585 |
| 4,183,645 | 1/1980 | Ohmura et al. | 354/106 |
| 4,292,627 | 9/1981 | Knight | 340/114 R |
| 4,325,059 | 4/1982 | Jaye | 340/585 |
| 4,467,154 | 8/1984 | Hill | 200/61.45 R |
| 4,503,299 | 3/1985 | Henrard et al. | 200/61.52 |
| 4,513,183 | 4/1985 | Hill | 200/61.45 R |
| 4,567,477 | 1/1986 | Cormier | 340/644 |
| 4,668,846 | 5/1987 | Klumpp | 200/61.45 R |
| 4,755,640 | 7/1988 | Cooley | 200/84 R |
| 4,789,922 | 12/1988 | Cheshire | 200/61.52 X |
| 4,900,880 | 2/1990 | Breed | 200/61.45 M |
| 4,956,629 | 9/1990 | Chen | 340/429 |
| 4,974,378 | 12/1990 | Shustov | 52/167 R |
| 4,988,839 | 1/1991 | Kennicott | 200/61.45 M |
| 5,155,308 | 10/1992 | Blair | 200/61.52 |
| 5,208,430 | 5/1993 | Ludzia | 200/61.52 |
| 5,209,343 | 5/1993 | Romano et al. | 200/61.52 |
| 5,220,998 | 6/1993 | Ford | 200/332 |
| 5,237,135 | 8/1993 | Wolski | 200/61.45 R |
| 5,252,795 | 10/1993 | Su | 200/61.52 |

*Primary Examiner*—J. R. Scott
*Attorney, Agent, or Firm*—Young, MacFarlane & Wood

[57] ABSTRACT

A gravity actuated switch and an automotive under hood or under deck lid light assembly utilizing the switch. The switch includes a blade and a ball mounted for rolling movement along the blade in response to a change in attitude of the switch. The ball is operative in response to such rolling movement to move the blade between a first configuration in which the switch is open and a second configuration in which the switch is closed. The blade comprises a beam member formed of a spring material arranged in cantilever fashion. The spring material of the beam is electrically conductive and the beam forms a part of the electrical circuit path through the switch.

5 Claims, 4 Drawing Sheets

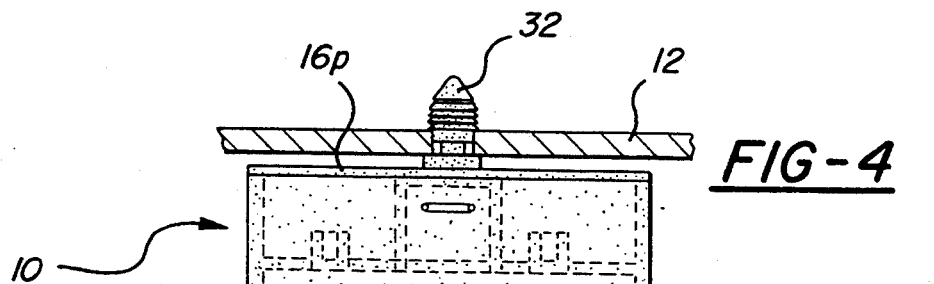
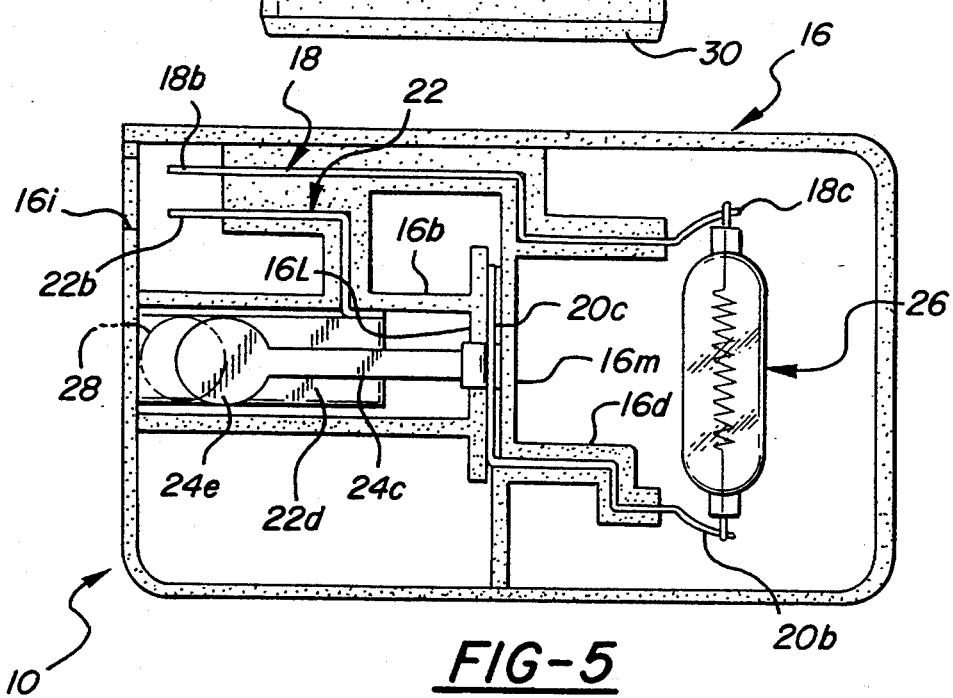
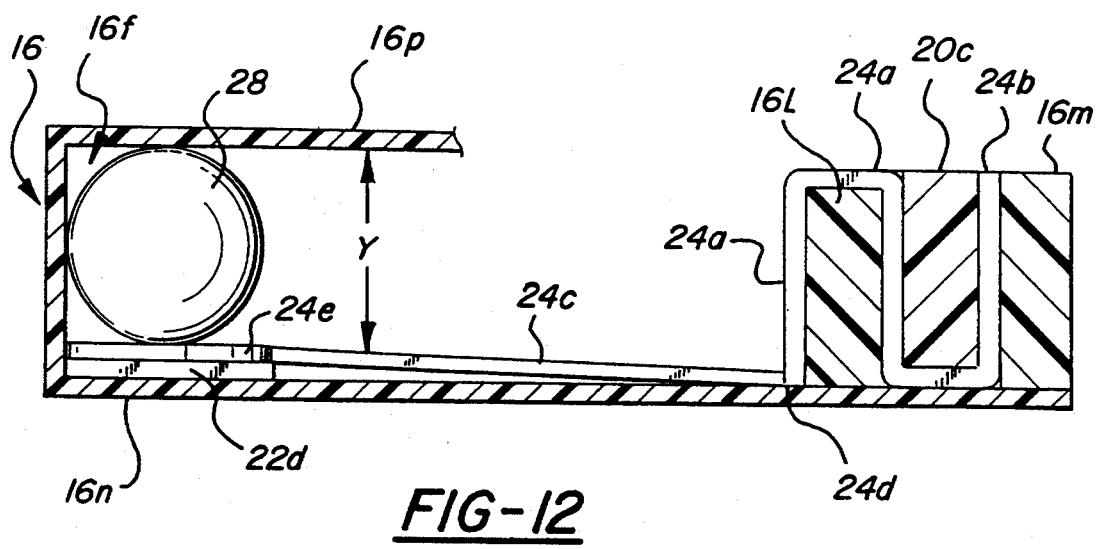

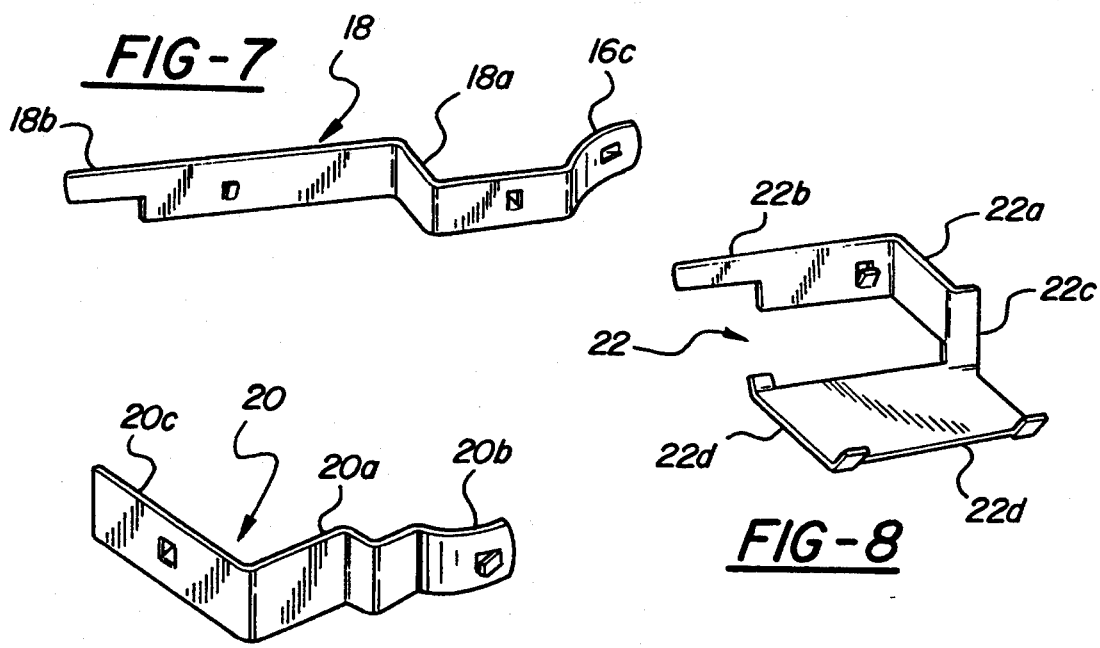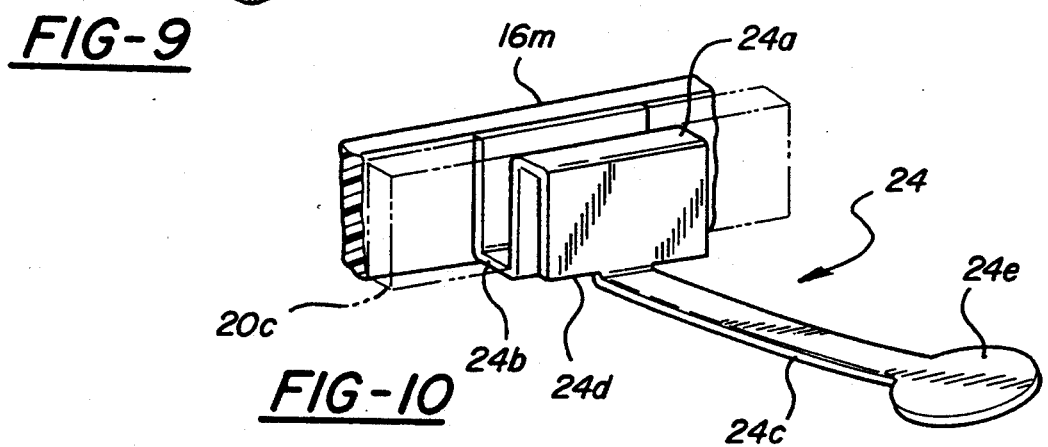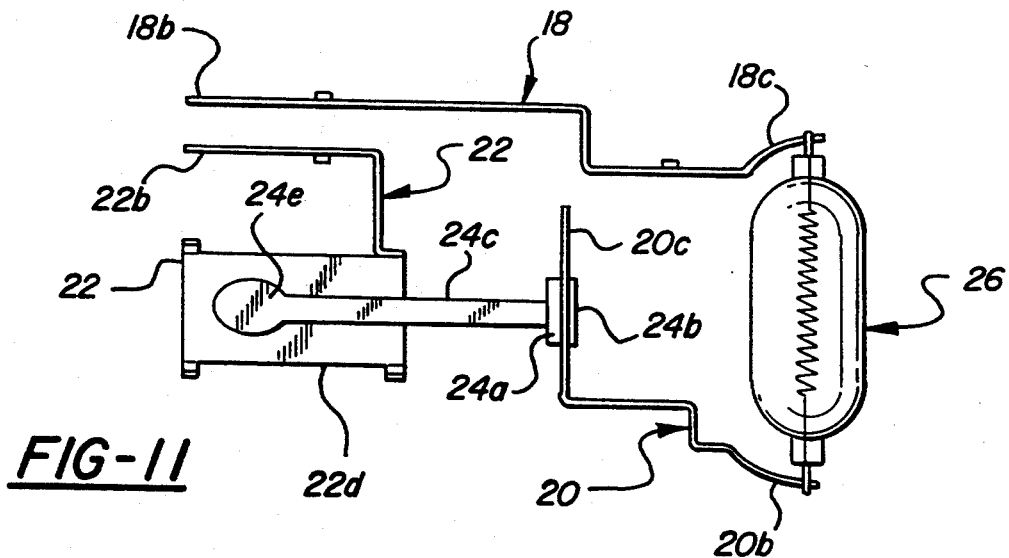

GRAVITY ACTUATED ELECTRICAL SWITCH AND LAMP ASSEMBLY

BACKGROUND OF THE INVENTION

This invention relates to gravity actuated switches and more particularly to a gravity actuated switch especially suitable for use in a lamp assembly.

Mercury tilt switches are commonly used to switch electrical circuits on and off as a function of the angle of inclination of the switch. In a typical mercury switch, a glob of mercury moves freely within a housing and, as the housing is inclined, gravity pulls the glob of mercury to one end of the housing where it completes an electrical circuit to close the switch and actuate the associated device, such as a lamp assembly positioned beneath the hood or trunk deck of a motor vehicle.

Mercury tilt switches are relatively inexpensive to produce and generally reliable in operation. However, since mercury is a highly toxic substance, there are many regulations governing the use, storage and disposal of mercury. There regulations have increased the expense of mercury switches to an extent that alternative non-mercury tilt switches are being developed. One type of alternative non-mercury tilt switch involves the use of a metal ball which moves in response to a change in attitude of the associated lamp assembly or the like to open and close the switch. Whereas these metal ball tilt switches are relatively simple in construction, their operation is not always reliable.

SUMMARY OF THE INVENTION

This invention is directed to the provision of an improved gravity actuated switch.

More specifically this invention is directed to the provision of an improved gravity actuated switch that is especially suitable for use in lamp assemblies employed beneath the hood or beneath the deck lid of motor vehicles.

The invention switch has an open position and a closed position and is gravity actuated. According to the invention, the switch includes a blade and a ball mounted for rolling movement along the blade in response to a change in attitude of the switch and operative in response to such rolling movement to move the blade between a first configuration in which the switch is open and a second configuration in which the switch is closed. This arrangement provides a reliable and durable switch construction.

According to a further feature of the invention, the blade comprises a beam member formed of a spring material and arranged in cantilever fashion. This specific arrangement is simple and provides positive movement of the switch between its open and closed positions.

According to a further feature of the invention, the spring material of the beam member is electrically conductive and the beam forms a part of an electrical circuit path through the switch.

In the disclosed embodiment of the invention the gravity actuated switch is employed as the control element of a lamp assembly; the lamp assembly includes a housing; a lamp bulb is mounted in the housing; and the gravity actuated switch is mounted in the housing and includes an open position in which the lamp bulb is deenergized and a closed position in which the lamp bulb is energized. The invention lamp assembly employing the invention gravity actuated switch is simple in construction and reliable in operation.

According to a further feature of the invention, the lamp assembly includes a first conductor path extending from a first input terminal of the lamp assembly to a first terminal of the bulb and a second conductor path extending from a second input terminal of the lamp assembly to a second terminal of the bulb, and the beam member comprising the blade of the switch forms a part of the second conductor path.

BRIEF DESCRIPTION OF THE DRAWINGS

FIG. 4 is an end view of the invention lamp assembly shown installed under the hood or deck lid of a motor vehicle;

FIG. 5 is a somewhat diagrammatic plan view of the invention lamp assembly;

FIGS. 7, 8, 9 and 10 are perspective views of individual components of the invention lamp assembly;

FIG. 11 is a schematic view showing the electrical circuit path through the invention lamp assembly; and FIG. 12 is a fragmentary somewhat schematic view showing the switching operation of the invention lamp assembly.

DETAILED DESCRIPTION OF THE PREFERRED EMBODIMENT

Figure 1:
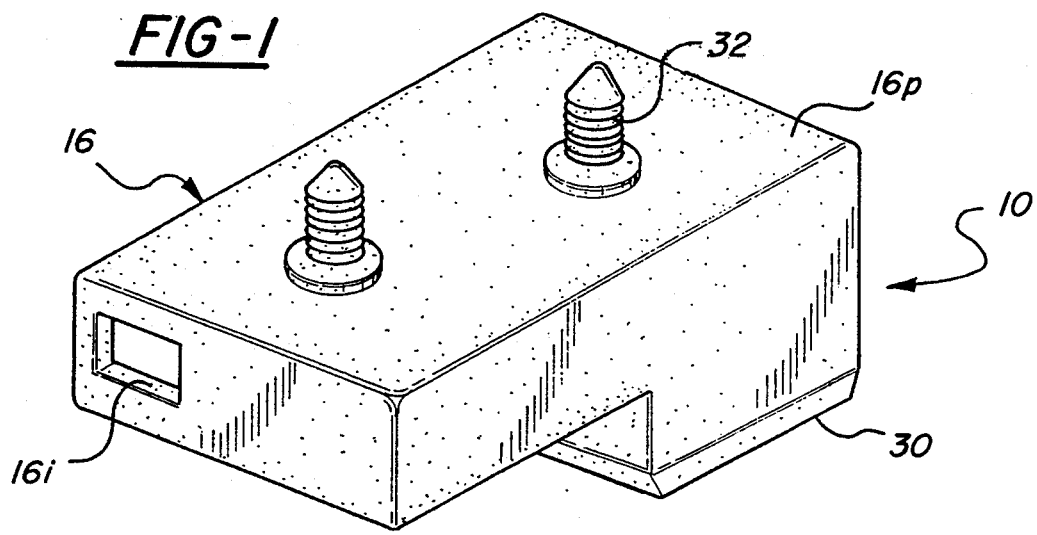
FIG. 1 is perspective view of the lamp assembly according to the invention.
Figure 2:
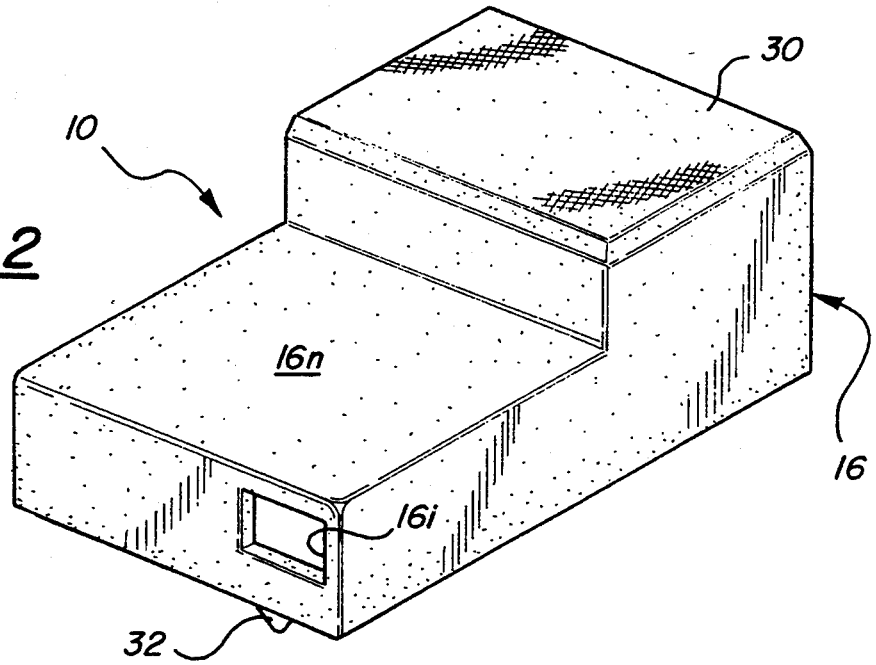
FIG. 2 is a perspective view of the invention lamp assembly shown in an inverted position as compared to FIG. 1.

The invention lamp assembly 10 is especially designed for use in a position beneath the hood or deck lid 12 of a motor vehicle so that as the hood or deck lid is pivoted about its hinge axis 14 the attitude of the switch changes in proportion to the amount of pivotal movement of the hood or deck lid about the axis 14.

The invention lamp assembly 10 includes a housing 16, a first conductor member 18, a second conductor member 20, a third conductor member 22, a blade member 24, a lamp bulb 26, and a ball 28.

Conductor members 18, 20, 22 and blade member 24 are formed of an electrically conductive material such as copper; housing 16 is preferably formed of a suitable plastic or other insulating material; and ball 28 may be formed of a conductive or insulating material and may for example comprise a steel ball of solid cross section.

Housing 16 includes exterior walls 16a and a network of interior walls or partitions 16b defining a compound channel 16c for receipt of conductor 18, a compound channel 16d for receipt of conductor 20, and a compound channel 16e for receipt of conductor 22. Housing 16 further defines a ball corridor 16f, a lamp chamber 16g, a plug chamber 16h, and an access opening 16i opening in the plug chamber 16h.

Conductor member 18 includes a compound main body portion 18a positioned in compound channel 16c, an input terminal end portion 18b positioned in plug chamber 16h, and a lamp terminal end portion 18c positioned in lamp chamber 16g.

Conductor member 20 includes a compound main body portion 20a positioned in compound channel 16d, a lamp terminal end portion 20b positioned in lamp chamber 16g, and an inboard terminal portion 20c positioned in a further, interior channel 16j defined by the housing.

Conductor member 22 includes a main body portion 22a positioned in compound channel 16e, an input terminal end portion 22a positioned in channel 16e, an input terminal end portion 22b positioned in plug chamber 16h, a riser portion 22c positioned in ball chamber 16f against one side wall of the chamber, and a contact plate portion 22d positioned in the bottom of ball chamber 16f against the bottom wall 16k of the housing.

Blade member 24 includes a mounting portion 24a of hook configuration positioned at the inboard end of ball corridor 16f and looped over the upper edge of housing partition 16l, a further mounting portion 24b of inverted hook configuration looped under and embracing the inboard terminal end portion 20c of conductor member 20 and sandwiched between terminal portion 20c and housing partition 16m, and a blade portion 24c. Blade portion 24c extends outwardly in cantilever fashion from the lower end 24d of mounting portion 24a, extends along the ball corridor, and terminates proximate the outboard end of the ball corridor in a generally circular paddle portion 24e.

Lamp bulb 26 comprises an elongated incandescent lamp bulb 26b positioned between lamp terminal end portions 18e and 20b of conductor members 18 and 20 and including a central filament 26b electrically connected at its opposite ends to lamp terminal end portions 18e and 20b so as to establish an electrical circuit extending through the filament 26b from lamp terminal end portion 20b to lamp terminal end portion 18e.

Ball 28 is positioned in ball chamber 16f on top of blade portion 24c of blade member 24.

Ball corridor 16f has a width X that is substantially equal to the depth Y of the corridor, and ball 28 has a diameter slightly less than the dimension X, Y so that the ball is free to roll along the corridor with its lateral movement constrained by the side walls of the corridor and its up and down movement constrained by the bottom and top walls 16n, 16p of the housing.

Housing 16 may be formed in one piece but, preferably, is formed from a plurality of housing sections which are assembled together in known manner after the conductor members, blade member, ball and bulb have been suitably mounted within the interior of the housing. The lamp assembly preferably includes a lens 30 positioned on housing 16 beneath bulb 26 and operative to defuse the light emanating from bulb 26.

Figure 3:
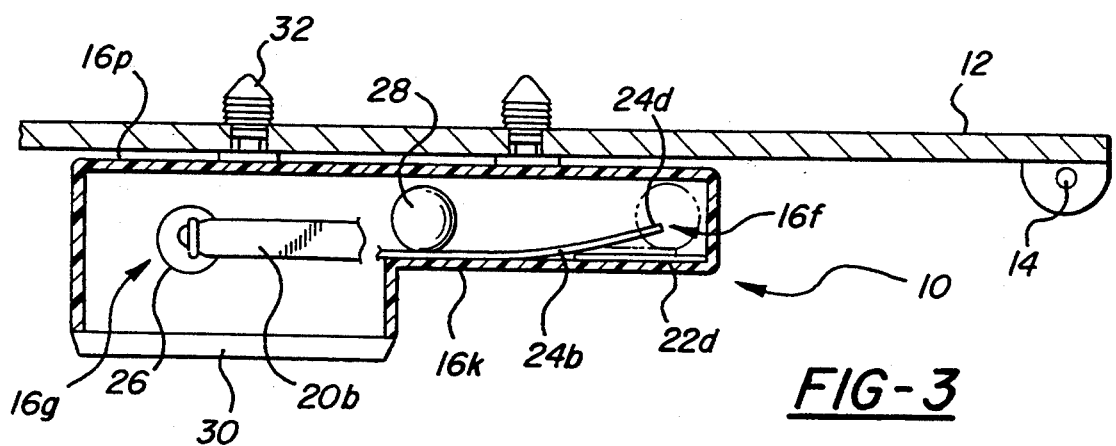
FIG. 3 is a somewhat diagrammatic view showing the lamp assembly installed under the hood or deck lid of a motor vehicle.
Figure 6:
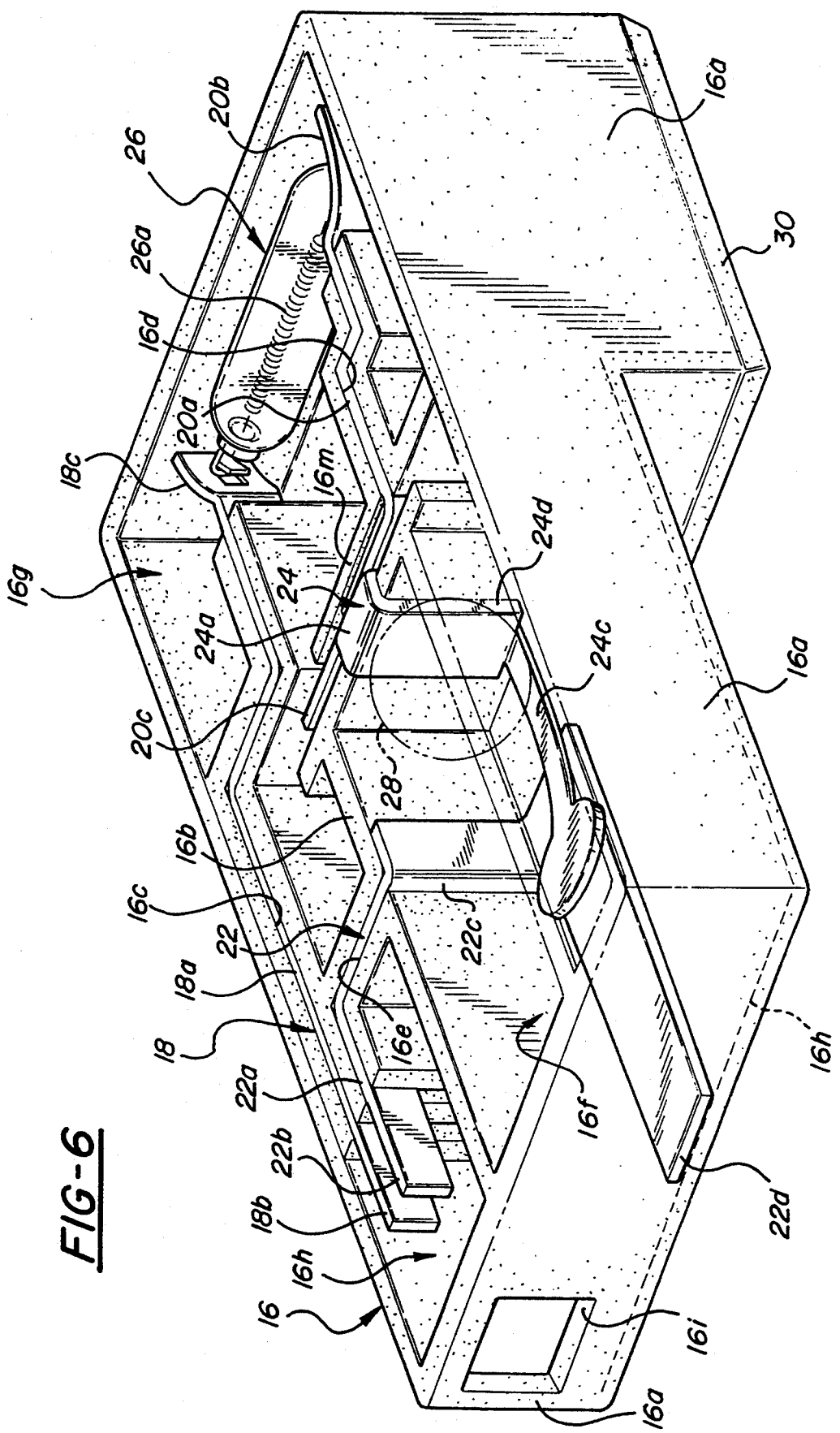
FIG. 6 is a perspective somewhat diagrammatic view of the invention lamp assembly.

In the use of the invention lamp assembly in an automotive under hood or under deck application, the lamp assembly is positioned beneath the hood or deck lid 12 utilizing fasteners 32 provided preferably as integral extensions of the top wall 16p of the housing, and electric power is provided to the lamp assembly by a suitable electric plug inserted through access opening 16i for electrical connection to terminal end portions 18b, 22b. In the normal lowered position of the hood or deck lid 12, and as best seen in FIG. 3, blade portion 24c is upwardly arcuately biased in cantilever fashion to position the paddle end 24e of the blade portion in upwardly spaced relation to the switch plate portion 22d of conductor member 22 with the ball 28 maintained in a position at the inboard end of the ball corridor 16f by the upward bias of the blade portion 24c.

In this disposition, the switch is open and the bulb 26 is deenergized. However, when the hood or deck lid 12 is raised to access the engine compartment of the trunk compartment, the attitude of the switch assembly is altered and ball 28, under the force of gravity, rolls within the ball corridor along the blade portion 24c onto the paddle end 24e of the blade. As the ball rolls along the blade the blade is pivoted downwardly about the fulcrum of its cantilever configuration until, as seen in the dashed line position of FIGS. 3 and 5 and the solid line position of FIG. 12, the ball reaches the outboard end of the ball corridor and the paddle portion 24e contacts the contact plate portion 22d of the conductor 22 to complete a conductive path between terminal 22b and terminal 20b and thereby energize the lamp 26.

When the hood or deck lid is returned to its closed, substantially horizontal position, the ball 28 moves rollably back along the blade portion 24c within the ball corridor to the solid line position of FIG. 3 so as to again open the conductive path between end terminals 22b and 20b and deenergize the bulb.

As best seen in FIG. 12, when the ball 28 reaches the actuated position at the outboard end of the ball corridor 16f, a large electrical contact area has been established as between the underface of the paddle 24e and the upper face of the contact plate portion 22d so as to establish a large current flow area as between conductor member 22 and blade member 24. This large current flow area ensures that current flow will be maintained irrespective of jiggling of the lamp assembly. Specifically, whereas jiggling of the lamp assembly might result in a partial separation of the paddle 24e and contact plate portion 22d with a corresponding reduction in flow path area between the paddle and the contact plate portion, even in extreme jiggling scenarios, contact will be maintained between the paddle and the contact plate portion and a current flow path will be maintained to maintain the bulb in an illuminated condition.

The invention will be seen to provide a simple and reliable gravity actuated switch and, further, will be seen to provide a gravity actuated switch that is especially suitable for use in under hood or under deck lid automotive light assemblies.

Whereas a preferred embodiment of the invention has been illustrated and described in detail it will be apparent that various changes may be made in the disclosed embodiment without departing from the scope or spirit of the invention.

We claim:

1. A gravity actuated electrical switch having an open position and a closed position characterized in that the switch includes:
   a housing;
   a conductor member mounted in the housing and including an input terminal end portion for connection to a source of electrical power and a large area contact plate portion;
   a blade member formed of an electrically conductive spring material and having a fixed end portion fixedly mounted on the housing and a beam portion extending outwardly in cantilever fashion from the fixed end portion to define a large area free end positioned in overlying relation to the contact plate portion of the conductor member; and
   a ball mounted for rolling movement along the beam portion of the blade in response to a change in attitude of the switch and operative in response to such rolling movement to resiliently move the free end of the beam portion of the blade member between a first configuration in which the ball is positioned on the beam portion at a location remote from the free end and the free end is spaced from the contact plate portion to maintain the switch open and a second configuration in which the ball has rolled along the beam portion to a position proximate the free end and the free end is resiliently deformed by the weight of the ball to assume a position against the contact plate portion to establish a large area electrical interface between the free end and the contact plate portion and thereby establish a large current flow area between the conductor member and the blade member to close the switch.

2. A switch according to claim 1 wherein:
the beam portion includes a relatively narrow blade portion extending outwardly from the fixed end in cantilever fashion and a relatively wide paddle portion defining the large area free end of the beam portion.

3. A lamp assembly including a housing, a lamp bulb mounted in the housing and a gravity actuated electrical switch mounted in the housing and having an open position in which the lamp bulb is deenergized and a closed position in which the lamp bulb is energized, characterized in that the switch includes a housing; a conductor member mounted in the housing and including an end portion defining an input terminal for connection to a source of electrical power and a large area contact plate portion; a blade member formed of an electrically conductive spring material and having a fixed end portion fixedly mounted on the housing and a beam portion extending outwardly in cantilever fashion from the fixed end portion to define a large area free end positioned in overlying relation to the contact plate portion of the conductor member; and a ball mounted for rolling movement along the beam portion of the blade in response to a change in attitude of the switch and operative in response to such rolling movement to resiliently move the free end of the beam portion of the blade member between a first configuration in which the ball is positioned on the beam portion at a location remote from the free end and the free end is spaced from the contact plate portion to maintain the switch open and the lamp bulb deenergized and a second configuration in which the ball has rolled along the beam portion to a position proximate the free end and the free end is resiliently deformed by the weight of the ball to assume a position against the contact plate portion to establish a large area electrical interface between the free end and the contact plate portion and thereby establish a large current flow area between the conductor member and the blade member to close the switch and energize the lamp bulb.

4. A lamp assembly according to claim 3 wherein:
the beam portion includes a relatively narrow blade portion extending outwardly from the fixed end in cantilever fashion and a relatively wide paddle portion defining the large area free end of the blade portion.

5. A lamp assembly according to claim 3 wherein:
the lamp assembly includes a first conductor path extending from the input terminal of the lamp assembly to a first terminal of the bulb and a second conductor path extending from another input terminal of the lamp assembly to a second terminal of the bulb; and
the beam portion forms a part of one of the conductor paths.

* * * * *